(12) United States Patent
Samuel et al.

(10) Patent No.: US 10,534,620 B2
(45) Date of Patent: Jan. 14, 2020

(54) SYSTEMS AND METHODS FOR ESTABLISHING CORE ROOT OF TRUST MEASUREMENT (CRTM) FOR BASIC INPUT/OUTPUT (BIOS) IMAGE RECOVERY

(71) Applicant: Dell Products, L.P., Round Rock, TX (US)

(72) Inventors: Balasingh Ponraj Samuel, Round Rock, TX (US); Ricardo L. Martinez, Leander, TX (US); Richard M. Tonry, Austin, TX (US); Wai-Ming Richard Chan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 231 days.

(21) Appl. No.: 15/826,922

(22) Filed: Nov. 30, 2017

(65) Prior Publication Data

US 2019/0163497 A1    May 30, 2019

(51) Int. Cl.
| | | |
|---|---|---|
| G06F 11/00 | (2006.01) |
| G06F 9/4401 | (2018.01) |
| G06F 13/42 | (2006.01) |
| G06F 11/14 | (2006.01) |

(52) U.S. Cl.
CPC ........ *G06F 9/4411* (2013.01); *G06F 11/1417* (2013.01); *G06F 11/1469* (2013.01); *G06F 13/4282* (2013.01); *G06F 2201/805* (2013.01); *G06F 2201/82* (2013.01)

(58) Field of Classification Search
CPC ............... G06F 9/4411; G06F 11/1469; G06F 11/1417; G06F 13/4282; G06F 2201/805; G06F 2201/82
See application file for complete search history.

(56) References Cited

U.S. PATENT DOCUMENTS

| | | | | |
|---|---|---|---|---|
| 8,954,805 B2 * | 2/2015 | Liu | .................. | G06F 8/654 |
| | | | | 714/36 |
| 2002/0147941 A1 * | 10/2002 | Gentile | ............... | G06F 11/1417 |
| | | | | 714/36 |
| 2003/0028800 A1 * | 2/2003 | Dayan | ................. | G06F 11/1433 |
| | | | | 726/34 |
| 2016/0328300 A1 * | 11/2016 | Rahardjo | ............ | G06F 11/1417 |
| 2017/0003956 A1 * | 1/2017 | Chang | .................... | G06F 8/654 |

* cited by examiner

*Primary Examiner* — Jason B Bryan
(74) *Attorney, Agent, or Firm* — Fogarty LLP (57) ABSTRACT

Systems and methods for establishing Core Root of Trust Measurement (CRTM) for Basic Input/Output (BIOS) image recovery are described. In some embodiments, an Information Handling System (IHS) may include a processor and a BIOS coupled to the processor, the BIOS having program instructions that, upon execution, cause the IHS to: during a boot process, verify integrity of a BIOS recovery image using a CRTM, and determine whether to restore the BIOS recovery image in response to the verification.

14 Claims, 7 Drawing Sheets

SYSTEMS AND METHODS FOR ESTABLISHING CORE ROOT OF TRUST MEASUREMENT (CRTM) FOR BASIC INPUT/OUTPUT (BIOS) IMAGE RECOVERY

FIELD

This disclosure relates generally to Information Handling Systems (IHSs), and more specifically, to systems and methods for establishing Core Root of Trust Measurement (CRTM) for Basic Input/Output (BIOS) image recovery.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the Operating System (OS), as well as other high-level software. In some IHSs, this low-level code is known as the Basic Input/Output System (BIOS). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface (EFI) Specification, and which has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, etc.

The inventors hereof have recognized that BIOS-based IHSs include manual and/or automatic BIOS recovery features that allow for the recovery of the BIOS if the IHS fails to boot properly—a possible cause being that the BIOS code becomes corrupted. As the inventors hereof have also discovered, however, these conventional BIOS image recovery mechanisms are vulnerable to security threats.

SUMMARY

Embodiments of systems and methods for establishing Core Root of Trust Measurement (CRTM) for Basic Input/Output (BIOS) image recovery are described herein. In an illustrative, non-limiting embodiment, an Information Handling System (IHS) may include a processor and a BIOS coupled to the processor, the BIOS having program instructions stored thereon that, upon execution, cause the IHS to: during a boot process, verify integrity of a BIOS recovery image using a CRTM, and determine whether to restore the BIOS recovery image in response to the verification.

In some implementations, the program instructions, upon execution, may cause the IHS to: detect changes in the BIOS recovery image and prevent the IHS from booting. Additionally or alternatively, the program instructions, upon execution, may cause the IHS to detect no changes in the BIOS recovery image; and allow the IHS to boot.

The BIOS may include a first pre-efi initialization phase (PEI) portion and a first Driver Execution Environment (DXE)/System Management Mode (SMM) portion, and the BIOS recovery image may include a second DXE/SMM portion. The program instructions, upon execution, may cause the IHS to verify the integrity of the first PEI portion using a hardware Root of Trust. Additionally or alternatively, the program instructions, upon execution, further cause the first PEI portion to chain the CRTM to the second DXE/SMM portion. Additionally or alternatively, the program instructions, upon execution, may cause the first PEI portion to compare a DXE measurement of the second DXE/SMM portion with a known value stored in the first PEI region.

The known value may include a value stored in a Platform Configuration Register (PCR) prior to initiation of the restore. The program instructions, upon execution, may cause the IHS to write contents of the second DXE/SMM portion to a Serial Peripheral Interface (SPI) module. Additionally or alternatively, the program instructions, upon execution, may cause the IHS to verify the DXE/SMM contents on the SPI; and in response to the verification, hand off execution to the second DXE/SMM portion on the SPI module.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods described herein may facilitate establishing Core Root of Trust Measurement (CRTM) for Basic Input/Output (BIOS) image recovery. Particularly, these techniques may help mitigate against attackers gaining access to an Information Handling System (IHS) during a BIOS recovery process using an otherwise vulnerable recovery image. In contrast, a recovery method that does not establish a Root of Trust for the BIOS recovery code can itself contain malicious code, which is then usable as an attack vector to access the BIOS code or the IHS, without the user's awareness.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
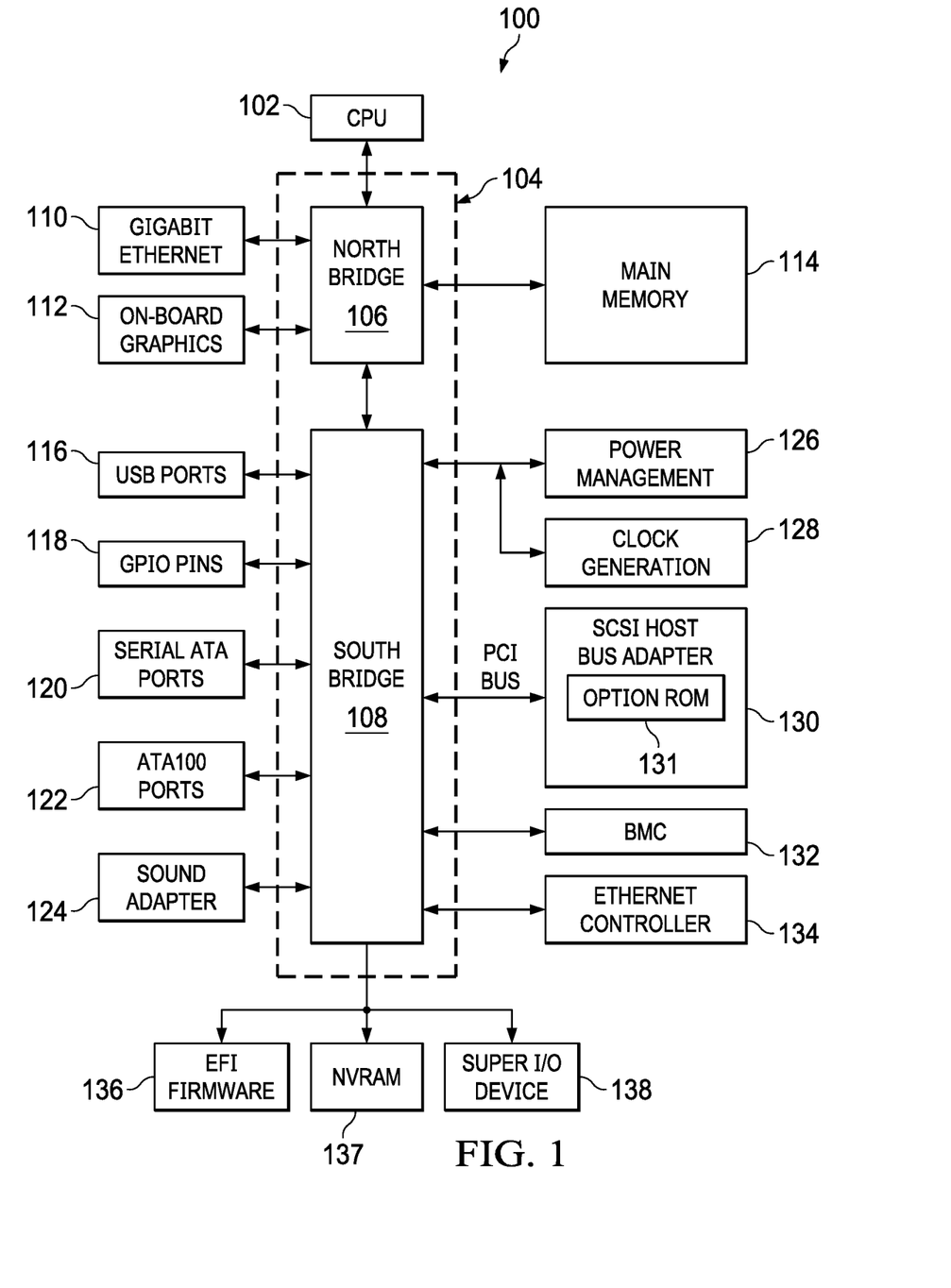
FIG. 1 is a block diagram of an example of an Information Handling System (IHS) configured to implement systems and methods, according to some embodiments.

FIG. 1 shows an example of an IHS configured to implement the systems and methods described herein. It should be appreciated that although certain embodiments described herein may be discussed in the context of a desktop or server computer, other embodiments may be utilized with virtually any type of IHS. In this example, the IHS is configured to facilitate establishing CRTM for BIOS recovery images.

Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and Southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS.

NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
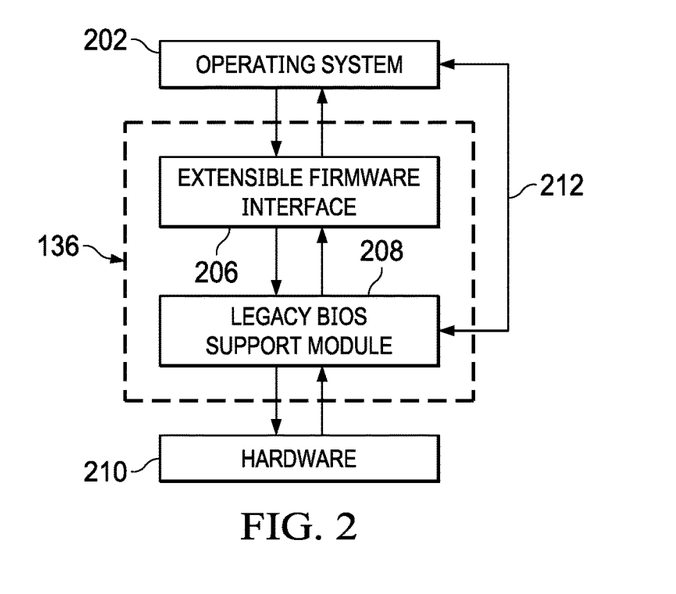
FIGS. 2 and 3 are block diagrams of examples of aspects of Basic Input/Output (BIOS) or Extensible Firmware Interface (EFI) firmware configured to implement systems and methods, according to some embodiments.

Referring now to FIG. 2, examples of aspects of an EFI environment created by BIOS/firmware 136 of the IHS are described. As shown, BIOS/firmware 136 comprises firmware compatible with the EFI Specification from INTEL CORPORATION or from the UEFI FORUM. The EFI Specification describes an interface between OS 202 and BIOS/firmware 136. Particularly, the EFI Specification defines the interface that BIOS/firmware 136 implements and the interface that OS 202 may use in booting.

According to an implementation of EFI, both EFI 206 and legacy BIOS support module 208 may be present in BIOS/firmware 136. This allows the IHS to support both firmware interfaces. In order to provide this, interface 212 may be used by legacy OSs and applications. Additional details regarding the architecture and operation of the EFI 206 are provided below with respect to FIG. 3.

Figure 3:
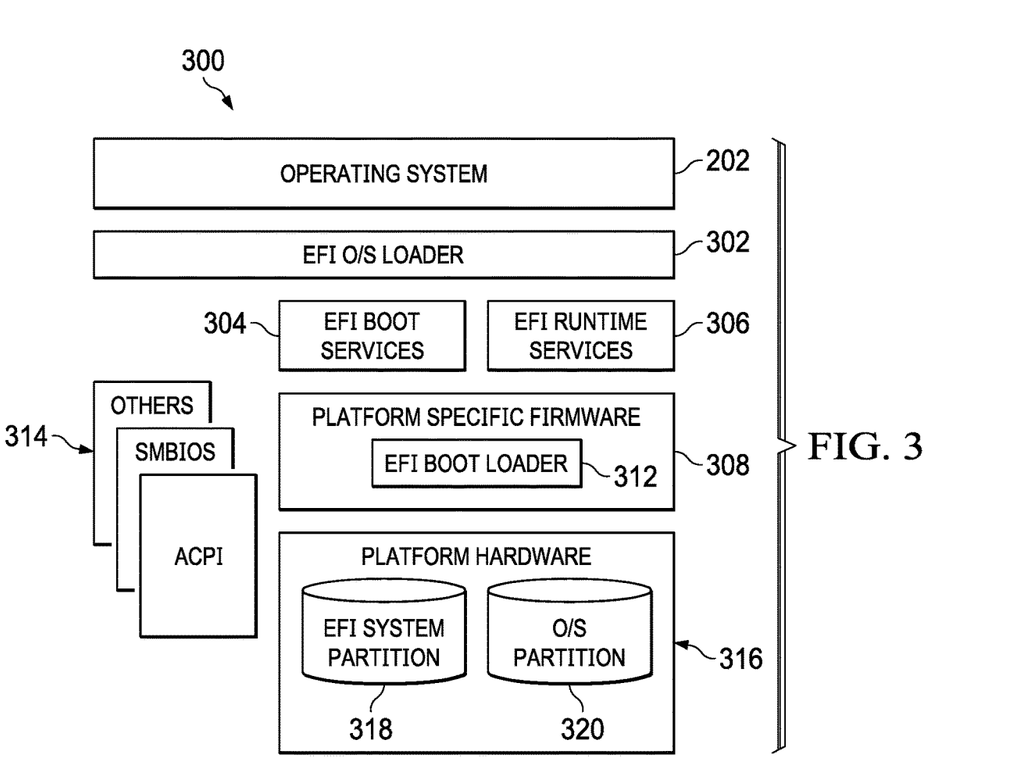

FIG. 3 provides additional details regarding an EFI Specification-compliant system 300 utilized to provide an operating environment for facilitate initialization and reconfiguration of replacement motherboards. As shown, system 300 includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, interfaces 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to EFI-defined runtime and boot services.

Various program modules provide the boot and runtime services. These program modules may be loaded by the EFI boot loader 312 at system boot time. EFI boot loader 312 is a component in the EFI firmware that determines which program modules should be explicitly loaded and when. Once the EFI firmware is initialized, it passes control to boot loader 312. Boot loader 312 is then responsible for determining which of the program modules to load and in what order.

In that context, UEFI Secure Boot is an industry-standard mechanism in the system BIOS for authenticating pre-boot code modules (e.g., device drivers or other software or firmware code). The UEFI specification defines data structures and logic for the authentication process. The BIOS maintains a Secure Boot policy having X.509 certificates, public keys, and image digests. The BIOS enforces the Secure Boot policy for each pre-boot code module that loads during the boot process. If a pre-boot code module cannot be authenticated or does not otherwise satisfy the Secure Boot policy, the BIOS does not load that module.

In various implementations, an IHS may use a Trusted Platform Module (TPM) and cryptographic techniques to provide measurements of software and platform components to make trust decisions. In such implementations, in addition or as an alternative to UEFI Secure Boot, IHS manufacturers can provide boot guard or platform secure boot features that prevent an IHS from running firmware images not released by that manufacturer. When the IHS is turned on, the CPU verifies a signature contained in the image before executing it, using the HASH of a public portion of a signing key. In some cases, the Root of Trust may serve as separate compute engine controlling the trusted computing platform cryptographic processor on the IHS However, neither do the aforementioned features nor does the UEFI Secure Boot provide a recovery mechanism that establishes a "Root of Trust" for a BIOS recovery image that is based on Core Root of Trust Measurement (CRTM). As used herein, the term "Root of Trust" encompasses one or more functions in a hardware trusted computing module (TPM) that are trusted by the OS. Moreover, examples of CRTM include measurements of code, data structures, configuration, information, etc.

Using techniques described herein, if any BIOS recovery image module being measured is modified, the resulting measurement would be different from what is expected, thus indicating that the recovery image has been altered or corrupted.

Figure 4:
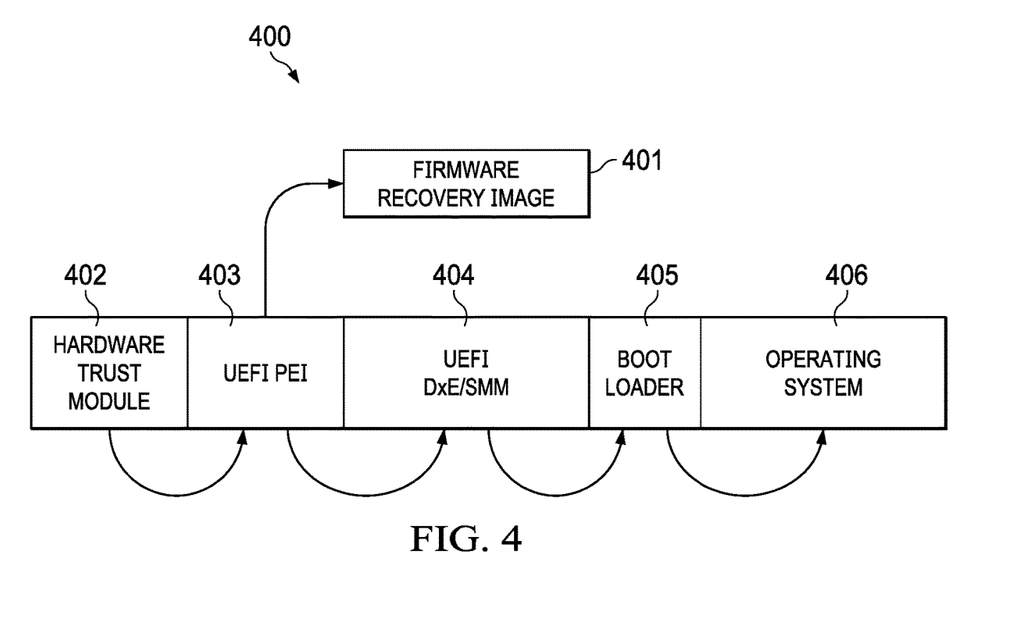
FIG. 4 is a block diagram of a Root of Trust established between hardware and a BIOS recovery image, according to some embodiments.

FIG. 4 shows Root of Trust 400 established between hardware and BIOS recovery image 401. During a booting process, the UEFI boot process takes place in three phases: a security phase (SEC), a pre-efi initialization phase (PEI), and a driver execution environment (DXE). The DXE phase may be divided into DXEBoot and DXERuntime.

The SEC phase contains CPU initialization code from the cold boot entry point on. The main function of this phase is to set the system to find, validate, install and run the PEI, which then configures the entire platform and then loads and boots the DXE. DXE is where the UEFI system loads drivers for configured devices, if necessary, mounts drives, and also finds and executes boot code. After control is transferred to the boot OS, the DXERuntime stays resident to handle OS to UEFI calls.

Still referring to FIG. 4, Root of Trust 400 is established during a boot process when a hardware trust module (e.g., a TPM module) establishes a trusted relationship with the UEFI code in the BIOS. In this case, as part of the boot process, Root of Trust hardware trust module 402 verifies the integrity of UEFI PEI code portion 403, UEFI PEI code portion 403 verifies the integrity of UEFI DXE/System Management Mode (SMM) code portion 404, UEFI DXE/SMM code portion 404 verifies the integrity of boot loader code portion 405, and boot loader portion 405 verifies the integrity of OS 406. In addition, however, UEFI PEI 402 also establishes a trusted link with BIOS recovery image 401.

Figure 5A:
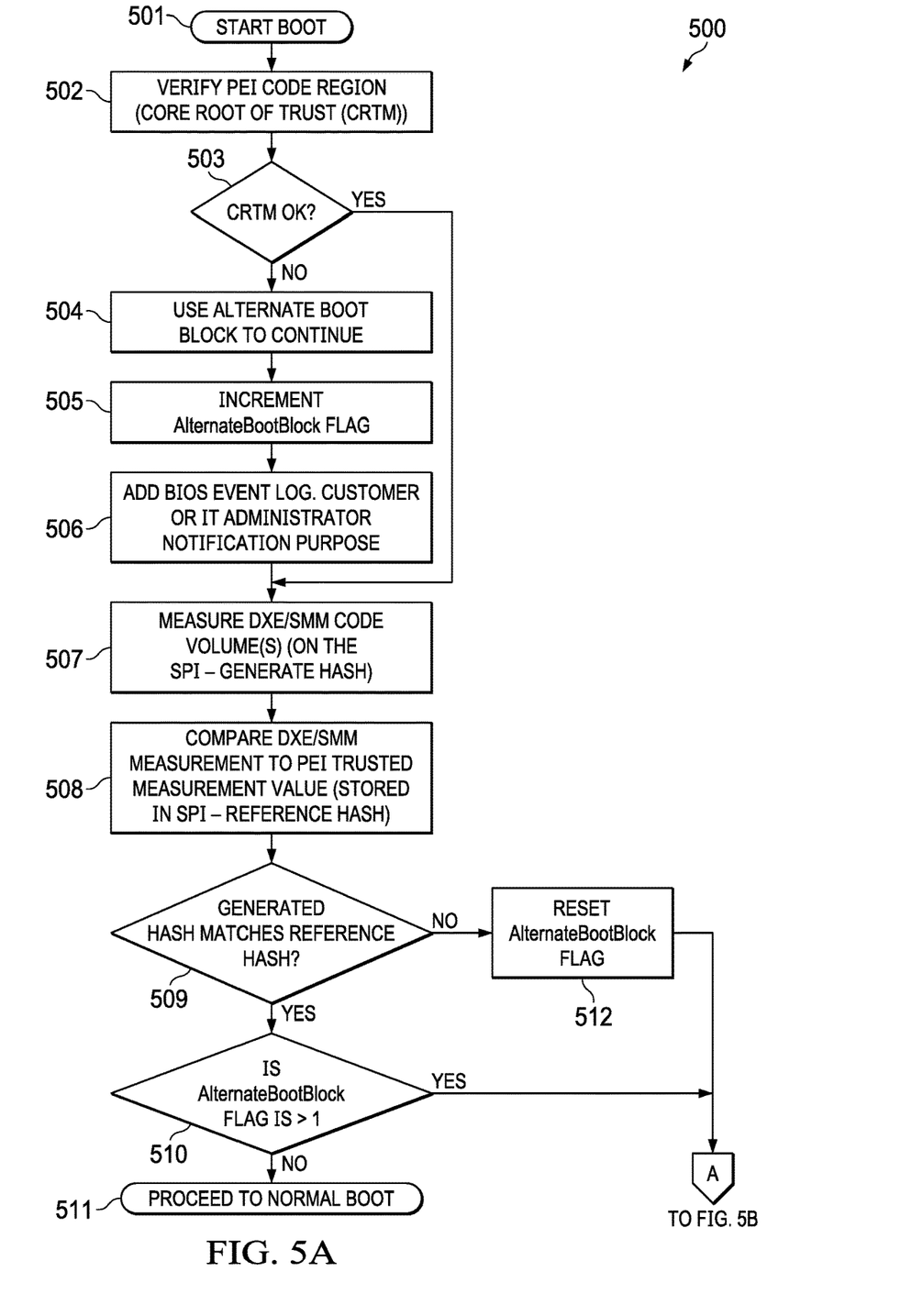
FIGS. 5A-C show a flowchart of an example of a method for creating a reference HASH from a BIOS building process, according to some embodiments.
Figure 5B:
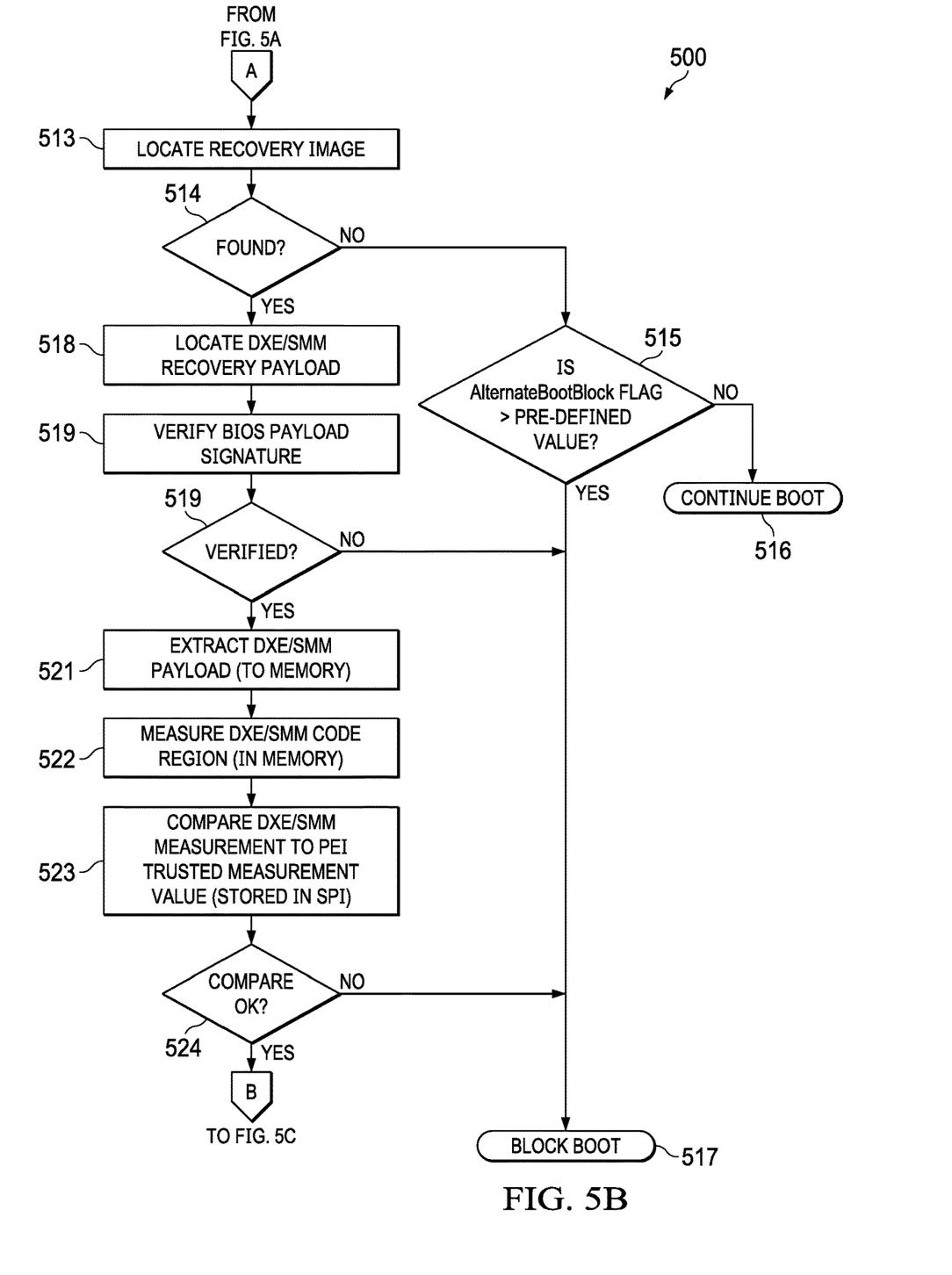
Figure 5C:
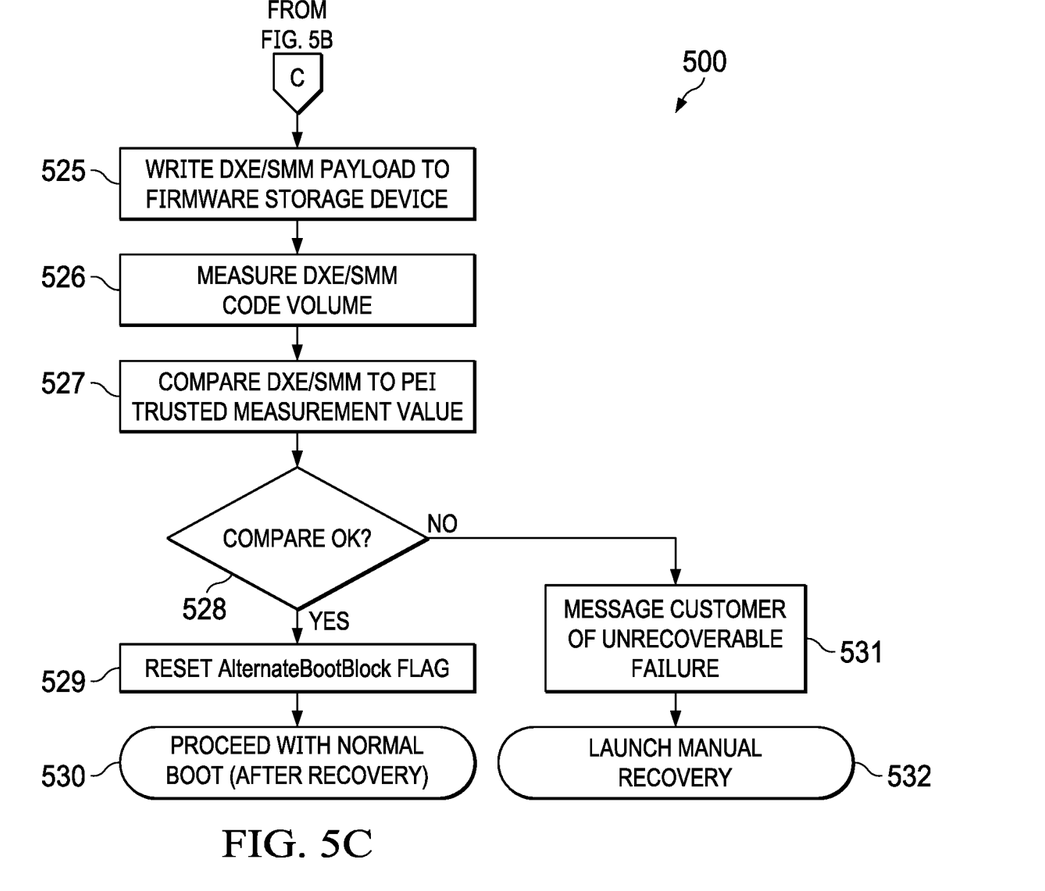

FIG. 5A-C show a flowchart of method 500 for recovering a corrupted BIOS with a recovery image trusted with CRTM. In this embodiment, method 500 starts the boot process at 501. At 502, method 500 verifies the PEI code region using CRTM. Then, 503 determines whether the CRTM is verified.

If the Boot Block is identified as corrupted at 503, method 500 uses an alternate Boot Block. Particularly, 504 uses an alternate Boot Block to continue, 505 increments an alternatebootblock flag, and 506 adds an entry to the BIOS event log, and alerts or notifies an administrator of the event. At 507, method 500 measures the DXE/SMM code volume(s), and generates a HASH value on the Serial Peripheral Interface (SPI) module or code. At 508, method 500 compares the DXE/SMM measurement to a PEI Trusted Measurement Value, which is a reference HASH stored in SPI.

At 509, if the generated HASH matched the reference HASH, 510 determines whether the alternatebootblock flag is set. If it is not, control passes to 511, and method 500 proceeds to normal boot. In this case, SPI is not corrupted or compromised (e.g., no malicious configuration parameters or other system changes). If the primary Boot Block code is corrupted, the system will successfully boot with alternate Boot Block code, the second time.

If block 510 determines that the alternatebootblock flag is set, method 500 proceeds to a recovery path to 513. If 509 determines that the generated HASH does not match the reference hash, 512 resets the alternatebootblock flag, method 500 proceeds to the recovery path to 513. Method 500 then attempts to locate the BIOS recovery image at 513. If 514 does not find the recovery image, 515 determines whether the number of alternatebootblock flag is greater than a threshold value. If not, method 500 continues to boot at 516. If so, 517 stops the boot process. In this case, the BIOS recovery image does not have Core Root of Trust, and it could potentially be used as an attack vector to gain access to the IHS.

If 514 find the recovery image, 518 locates the DXE/SMM recovery payload and 519 verifies the BIOS payload signature. If the signature is not verified, 517 stops the boot process. Otherwise, 521 extracts DXE/SMM payload to memory, 522 measures DXE/SMM code region (in memory), and 523 compare DXE/SMM measurements to the PEI Trusted Measurement Value (stored in SPI module). If 524 determines that the comparison does not check, again 517 stops the boot process.

Conversely, if 524 determines that the comparison checks, method 500 begins a restore path. Particularly, 525 writes the DXE/SMM payload to the firmware storage device. 526 measures DXE/SMM code volume, and 527 compares DXE/SMM to the PEI Trusted Measurement Value.

At 528, method 500 determines if the comparison of 527 checks. If so, 529 resets the alternatebootblock flag, and 530 proceeds with the normal boot process after recovery. In this case, the BIOS recovery process with the trusted recovery image is successful.

If 528's comparison does not check, 531 messages a customer of an unrecoverable failure, and 532 launches manual recovery process. In this case, there is a potential hardware (SPI device) failure, and the customer is notified to recover with another version of the BIOS.

In some embodiments, method 500 allows BIOS recovery only if a trusted link established between hardware and recovery image, and it allows an alternate Boot Block to continue boot in the event of Boot Block corruption. Method 500 also stops the boot process if the Boot Block is not restored after a pre-determined amount of boot. As such, method 500 may facilitate differentiating hardware failures from potential attack vectors.

Figure 6:
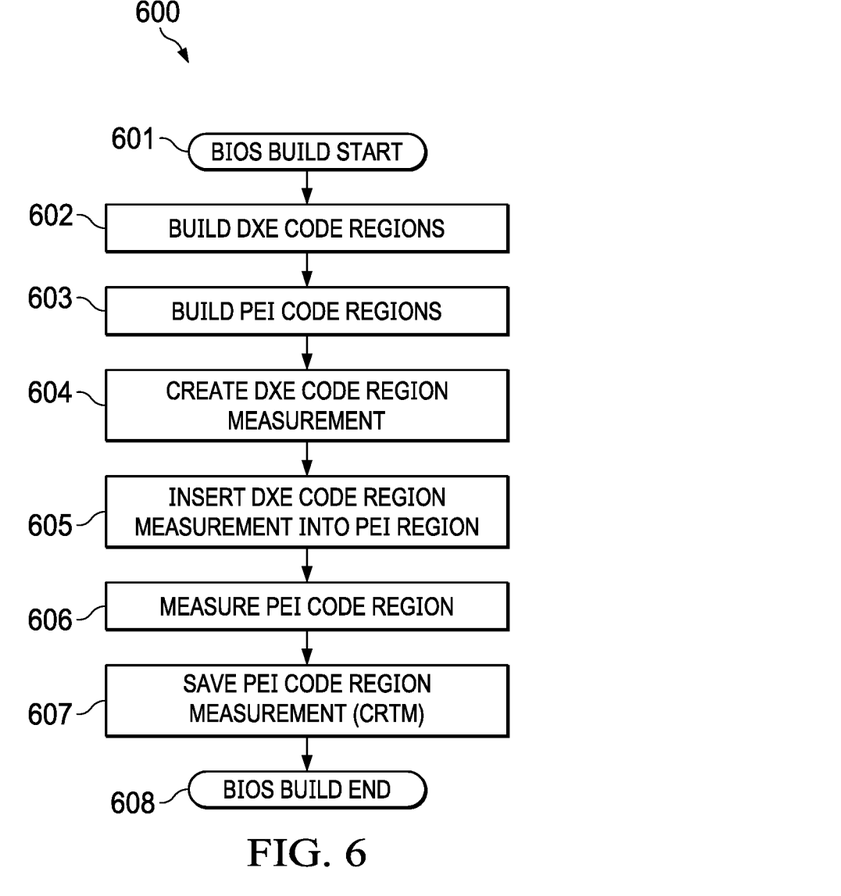
FIG. 6 is a flowchart of an example of a method for establishing Core Root of Trust Measurement (CRTM) for BIOS image recovery, according to some embodiments.

FIG. 6 shows method 600 for creating a reference HASH from the BIOS building process. At 601, the BIOS build process starts. At 602, method 600 builds DXE code regions. At 603, method 600 builds PEI code regions. At 604, method 600 creates a DXE Code Region Measurement, and at 605 method 600 inserts it into the PEI region. At 606, method 600 measures the PEI code region. At 607, method 600 saves the PEI Code Region Measurement. Finally, at 608, the BIOS building process ends.

Accordingly, systems and methods described herein provide a mechanism to directly confirm the integrity of the BIOS data with a trusted known value, and to initiate the recovery based on a failed integrity verification.

In some cases, another recovery feature (e.g., INTEL's BootGuard or AMD's Secure Boot) may be used to restore a corrupted or altered Boot Block, if needed, using a similar CRTM. The Boot Block establishes the PEI Root of Trust to ensure the PEI code, and measurements performed to chain-verify the DXE/SMM boot phase are trusted (not tampered with). Each block of code contains a cryptographic digest of the next region. Each region is verified by the previous region via CRTM trust chaining.

Once the Boot Block CRTM is established, the Boot Block may cryptographically measure/verify the PEI region. The PEI code may be configured to cryptographically verify the DXE/SMM code regions, and compare it to a known cryptographic digest (or HASH) value within the PEI Boot Block region. If the measurement does not compare, the Boot Block code may automatically trigger a recovery of the DXE/SMM code regions from a backup BIOS image stored on the EFI System Partition (ESP) or other storage location.

If the BIOS PEI region is altered, the signature of the PEI regions will not match, triggering a PEI recovery of the Boot Block code region using a backup copy of the Boot Block. Once the PEI image is known to be good, the trusted PEI code (BIOS) measures the DXE code regions. The code regions are compared to known good values stored in the PEI code region. If the measurement compares correctly, the IHS will boot normally. If the DXE code regions do not compare, the PEI code initiates a recovery.

Trusted PEI code may initiate a recovery from the backup recovery image on a storage medium, such as the HDD, or a backup copy on the SPI. The PEI code may extract the DXE/SMM code region to memory and perform BIOS update signature verification on the payload. If the signature verification check passes, the trusted PEI code may perform a HASH of the DXE/SMM code and compare the measurement to the known good measurement stored in PEI code region. If the measurement compares, the trusted PEI code may write the contents of the DXE/SMM code volume(s) to the SPI part.

The trusted PEI code may then verify the DXE/SMM code region on the SPI. If the code region image compares correctly, the trusted PEI code may hand off execution to the verified and trusted DXE code (on the SPI; no reboot is required). If however, the measurement fails, there is potentially an attack using an altered BIOS recovery image or the failure could be a result of a malfunction with the hardware, the boot is blocked. The customer is notified of the failure, and is allowed to launch a manual recovery operation.

If the BIOS has been overwritten in an attempt to gain an escalation of privilege, an automatic recovery method may detect the changes to the SPI code, and restore the image before an attacker can gain access to the platform Root of Trust.

If the image verification fails at any point in the process, the recovery is blocked to prevent unauthorized code from being installed in the system (using the recovery mechanism as a potential backdoor for malicious code injection). Furthermore, the system may be prevented from booting, and the customer may be prompted to indicate a corruption issue (if possible). This serves two purposes: for a normal failure, the customer is prompted to get help, and, for a malicious user attempting to hack the BIOS, the platform will become unusable.

To reduce boot time impact, techniques described herein may make use of measurements already taken during normal boot. PEI code chains the CRTM to DXE by measuring DXE to a trusted value—i.e. the known good value stored in PEI can be the value of Platform Configuration Registers—PCR. Because code volumes are already measured in PEI, there is no additional performance hit.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information Handling System (IHS), comprising:
a processor; and
a memory containing a Basic Input/Output System (BIOS) coupled to the processor, the BIOS comprising program instructions that, upon execution, cause the IHS to:
during a boot process, verify integrity of a BIOS recovery image using a Core Root of Trust Measurement (CRTM);
determine whether to restore the BIOS recovery image in response to the verification, wherein the BIOS includes a first pre-efi initialization phase (PEI) portion and a first Driver Execution Environment (DXE)/System Management Mode (SMM) portion, and wherein the BIOS recovery image includes a second DXE/SMM portion; and
verify the integrity of the first PEI portion using a hardware Root of Trust, wherein the program instructions, upon execution, further cause the first PEI portion to chain the CRTM to the second DXE/SMM portion to verify the second DXE/SMM portion.

2. The IHS of claim 1, wherein the program instructions, upon execution, further cause the IHS to:
detect changes in the BIOS recovery image; and
prevent the IHS from booting.

3. The IHS of claim 1, wherein the program instructions, upon execution, further cause the IHS to:
detect no changes in the BIOS recovery image; and
allow the IHS to boot.

4. The IHS of claim 1, wherein the program instructions, upon execution, further cause the first PEI portion to compare a DXE measurement of the second DXE/SMM portion with a known value stored in the first PEI portion.

5. The IHS of claim 4, wherein the known value includes a value stored in a Platform Configuration Register (PCR) prior to initiation of the restore.

6. The IHS of claim 4, wherein the program instructions, upon execution, further cause the IHS to write contents of the second DXE/SMM portion to a Serial Peripheral Interface (SPI) module.

7. The IHS of claim 4, wherein the program instructions, upon execution, further cause the IHS to:
verify the DXE/SMM contents on the SPI; and
in response to the verification, hand off execution to the second DXE/SMM portion on the SPI module.

8. A memory containing a Basic I/O System (BIOS) comprising program instructions that, upon execution by an information Handling System (IHS), cause the IHS to:
during a boot process, verify integrity of a BIOS recovery image using a Core Root of Trust Measurement (CRTM), wherein the BIOS includes a first pre-efi initialization phase (PEI) portion and a first Driver Execution Environment (DXE)/System Management Mode (SMM) portion, and wherein the BIOS recovery image includes a second DXE/SMM portion;
determine whether to restore the BIOS recovery image in response to the verification;
verify the integrity of the first PEI portion using a hardware Root of Trust, wherein the program instructions, upon execution, further cause the first PEI portion to chain the CRTM to the second DXE/SMM portion to verify the second DXE/SMM portion.

9. The BIOS of claim 8, wherein the program instructions, upon execution, further cause the first PEI portion to compare a DXE measurement of the second DXE/SMM portion with a known value stored in the first PEI portion.

10. The BIOS of claim 9, wherein the program instructions, upon execution, further cause the IHS to write contents of the second DXE/SMM portion to a Serial Peripheral Interface (SPI) module.

11. The BIOS of claim 10, wherein the program instructions, upon execution, further cause the IHS to:
verify the DXE/SMM contents on the SPI; and
in response to the verification, hand off execution to the second DXE/SMM portion on the SPI module.

12. In an Information Handling System (IHS) comprising a memory containing a Basic I/O System (BIOS) coupled to a processor, a method comprising:
during a boot process, verifying integrity of a BIOS recovery image using a Core Root of Trust Measurement (CRTM), wherein the BIOS includes a first pre-efi initialization phase (PEI) portion and a first Driver Execution Environment (DXE)/System Management Mode (SMM) portion, and wherein the BIOS recovery image includes a second DXE/SMM portion;
determining whether to restore the BIOS recovery image in response to the verification; and
verifying the integrity of the first PEI portion using a hardware Root of Trust, and causing the first PEI portion to chain the CRTM to the second DXE/SMM portion.

13. The method of claim 12, wherein the program instructions, upon execution, further cause the first PEI portion to compare a DXE measurement of the second DXE/SMM portion with a known value stored in the first PEI portion, and to write contents of the second DXE/SMM portion to a Serial Peripheral Interface (SPI) module.

14. The method of claim 13, further comprising verify the DXE/SMM contents on the SPI; and in response to the verification, handing off execution to the second DXE/SMM portion on the SPI module.

* * * * *